United States Patent
Yeom et al.

(10) Patent No.: US 11,161,250 B2
(45) Date of Patent: Nov. 2, 2021

(54) MOVING ROBOT AND CONTROL METHOD THEREFOR

(71) Applicant: LG ELECTRONICS INC., Seoul (KR)

(72) Inventors: Jungho Yeom, Seoul (KR); Youngwoo Kim, Seoul (KR); Dami Choe, Seoul (KR); Darae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 198 days.

(21) Appl. No.: 16/482,350

(22) PCT Filed: Mar. 22, 2017

(86) PCT No.: PCT/KR2017/003059
§ 371 (c)(1),
(2) Date: Jul. 31, 2019

(87) PCT Pub. No.: WO2018/143509
PCT Pub. Date: Aug. 9, 2018

(65) Prior Publication Data
US 2021/0129344 A1 May 6, 2021

(30) Foreign Application Priority Data
Feb. 2, 2017 (KR) .................. 10-2017-0015106

(51) Int. Cl.
*B25J 11/00* (2006.01)
*G05D 1/02* (2020.01)

(52) U.S. Cl.
CPC .......... *B25J 11/008* (2013.01); *G05D 1/0214* (2013.01); *G05D 1/0223* (2013.01);
(Continued)

(58) Field of Classification Search
CPC ... B25J 11/008; G05D 1/0274; G05D 1/0214; G05D 1/0223; G05D 1/0276; G05D 2201/0206
See application file for complete search history.

(56) References Cited

U.S. PATENT DOCUMENTS

2007/0150108 A1 6/2007 Yokoyama et al.
2009/0198380 A1* 8/2009 Friedman .................. B25J 5/00
700/259

(Continued)

FOREIGN PATENT DOCUMENTS

JP 2002-006949 1/2002
JP 2007-139710 6/2007

(Continued)

OTHER PUBLICATIONS

International Search Report (with English Translation) and Written Opinion dated Oct. 24, 2017 issued in Application No. PCT/KR2017/003059.

(Continued)

*Primary Examiner* — Rodney A Butler
(74) *Attorney, Agent, or Firm* — KED & Associates LLP

(57) ABSTRACT

The present invention comprises: a main body; an information collecting unit for receiving input of user information; a moving guide unit configured to enable a part of a user's body to be in contact with the main body; a moving unit configured to move the main body; and a control unit which, when sensing that a part of a user's body is in contact with the moving guide unit, controls the moving unit so that the main body moves along a moving route extracted from the user information, wherein the control unit controls the moving unit to allow the main body to move according to a walking speed of the user.

21 Claims, 14 Drawing Sheets

(52) U.S. Cl.
CPC ......... *G05D 1/0274* (2013.01); *G05D 1/0276* (2013.01); *G05D 2201/0206* (2013.01)

(56) References Cited

U.S. PATENT DOCUMENTS

| | | | |
|---|---|---|---|
| 2013/0325244 A1* | 12/2013 | Wang | G06T 11/00 701/26 |
| 2015/0182408 A1* | 7/2015 | Roh | A61H 3/00 482/51 |
| 2016/0193733 A1* | 7/2016 | Abdullah | A61B 5/14532 700/240 |
| 2018/0199876 A1* | 7/2018 | Liu | A61B 3/112 |

FOREIGN PATENT DOCUMENTS

| | | |
|---|---|---|
| JP | 2009-136974 | 6/2009 |
| KR | 10-2006-0084916 | 7/2006 |
| KR | 10-0840427 | 6/2008 |
| KR | 10-2009-0000637 | 1/2009 |
| KR | 10-2013-0079054 | 7/2013 |
| KR | 10-1361362 | 2/2014 |

OTHER PUBLICATIONS

Korean Office Action dated Sep. 13, 2018 issued in KR Application No. 10-2017-0015106.
Korean Office Action dated Mar. 27, 2019 issued in KR Application No. 10-2017-0015106.

* cited by examiner (a)  (b)

(a)

(b)

(a)

(b)

(a)

(b)

MOVING ROBOT AND CONTROL METHOD THEREFOR

CROSS-REFERENCE TO RELATED PATENT APPLICATIONS

This application is a U.S. National Stage Application under 35 U.S.C. § 371 of PCT Application No. PCT/KR2017/003059, filed Mar. 22, 2017, which claims priority to Korean Patent Application No. 10-2017-0015106, filed Feb. 2, 2017, whose entire disclosures are hereby incorporated by reference.

TECHNICAL FIELD

The present disclosure relates to a moving robot capable of walking with a user, and a control method therefor.

BACKGROUND ART

A robot is a machine designed to perform a given task on its own or operate automatically through its own capabilities.

There are many types of robots with different usage areas: industrial robots, medical robots, space robots, and underwater robots. In the early days of robot development, robots that perform tasks dangerous for humans like a semiconductor process have been mostly developed. Recently, however, with the development of technology, not only industrial robots but also robots that perform tasks closely related to our daily lives such as medical robots capable of performing tasks requiring a high level of precision are being developed.

Efforts are ongoing to support and increase the functionality of robots. Such efforts include software and hardware improvements, as well as changes and improvements in the structural components.

In the case of a hospital or an airport, a space that is not frequently used but has various facilities in a single place, a user may experience inconvenience or discomfort in using each of the facilities. Assigning employees to each and every user using the facilities for locations or facilities use guide is not possible and is a waste of human resources.

Therefore, there is an increasing need to develop robots that provide a user's moving route and assist a user in walking in such a place.

DISCLOSURE

Technical Problem

One aspect of the present disclosure is to provide a moving robot capable of assisting a user in walking when the user uses a plurality of facilities installed in a single place.

Another aspect of the present disclosure is to provide a moving robot capable of providing user-customized route information.

Still another aspect of the present disclosure is to provide a moving robot capable of monitoring a health condition of a user in real time and taking an appropriate measure.

Technical Solution

In order to achieve the aspects and other advantages, there is provided a moving robot including a main body, an information collecting unit configured to receive user information, a moving guide unit formed such that a body part of a user makes contact with the main body, a moving unit configured to move the main body, and a controller configured to control the moving unit such that the main body moves along a moving route extracted from the user information when it detects that the body part of the user is in contact with the moving guide unit. The controller may control the moving unit such that the main body moves according to a walking speed of the user.

In one embodiment, the controller may control the moving unit such that the main body moves in a direction opposite to the moving route in order to approach the user, or the main body stops moving when movement of the user is not sensed.

In one embodiment, the controller may detect situation information indicating a surrounding situation of the main body when the movement of the main body is stopped, and may output notification information of an emergency situation when the situation information is determined as the emergency situation.

In one embodiment, the moving guide unit may include a handle formed to be in contact with the body part of the user, a connecting portion connecting the handle to the main body, a rotating portion formed to vertically rotate the connecting portion, and a fixing portion formed to fix the connecting portion so that the handle is fixed at a specific position.

In one embodiment, a camera configured to capture a user image may be further provided. The controller may extract body information of the user from the user image, and rotate the connecting portion through the rotating portion so that the handle is located at a specific position based on the extracted body information.

In one embodiment, a speed sensor configured to measure the walking speed of the user may be further provided. The controller may detect the walking speed of the user based on sensing information measured by the speed sensor.

In one embodiment, the controller may generate the moving route based on a preset condition.

In one embodiment, the preset condition may be a condition related to at least one information of the walking speed, a health condition and a current position of the user and a number of persons waiting.

In one embodiment, the moving route may include information of a plurality of points. The controller may regenerate the moving route based on information of a number of persons waiting at each of the plurality of points.

In one embodiment, the information of the number of persons waiting may be received from a preset external server so as to enable wireless communications.

In one embodiment, a camera configured to capture a user image may be further provided. The controller may generate health information of the user based on the user image.

In one embodiment, the controller may transmit the health information of the user to a preset external server.

In one embodiment, the moving route may include a plurality of points. The controller may control the moving unit such that the main body stops moving when arriving at a specific point among the plurality of points, and controls the moving unit such that the main body moves again when the body part of the user makes contact with the moving guide unit again.

In one embodiment, a wireless communication unit for communicating with a preset external server may be further provided. The controller may output guidance information for evacuation so that people in the vicinity of the main body are evacuated when a warning of an emergency situation is received from the external server.

In one embodiment, a display unit for displaying visual information may be further provided. The controller may output guidance information related to user information on the display unit so as to guide the user to enter the user information when it senses that the user approaches the main body.

In one embodiment, the controller may control the moving unit to move the main body to a preset start position when the main body arrives at a destination point of the moving route.

In another embodiment of the present disclosure, there is provided a control method for a moving robot, the control method including, receiving user information, detecting whether the body part of the user is in contact with a moving guide unit of the moving robot, and moving a main body of the moving robot along a moving route extracted from user information when it is detected that the body part of the user is in contact with the moving guide unit. The main body of the moving robot may move according to a walking speed of the user.

In one embodiment, the moving of the main body of the moving robot may further include sensing movement of the user, moving the main body in a direction opposite to the moving route in order to approach the user, or stopping the main body when movement of the user is not sensed.

In one embodiment, the stopping the movement of the main body may include detecting situation information indicating a surrounding situation of the main body when the movement of the main body is stopped, and outputting notification information of an emergency situation when the situation information is determined as the emergency situation.

In one embodiment, the controller may generate moving route based on at least one information of the walking speed, a health condition and a current position of the user, and a number of persons waiting.

Advantageous Effects

In a moving robot according to the present disclosure, guidance information of facilities installed in a specific place is provided to a user who uses the specific place by using user information, and at the same time, a moving speed of the moving robot is controlled according to a walking speed of the user while walking together with the user in a state that a body part of the user is in contact with the moving robot, thereby assisting a user having difficulty in walking.

In addition, a moving robot according to the present disclosure can monitor a health condition of a user in real time while moving together with the user, and take an appropriate measure according to health information indicating the health condition of the user. By doing so, the user can get help from the moving robot in a dangerous situation or in a situation requiring an immediate action while moving together with the moving robot. In addition, it can reduce the time taken to use a facility in a place for the user.

In addition, a moving robot according to the present disclosure can provide user-customized route information according to a physical condition of a user and a current status of facility use by generating route information based on a preset condition such as a walking speed of the user, etc.

Further, a moving robot according to the present disclosure can provide an evacuation guide in an emergency situation, thereby enabling a user not familiar with a specific place to respond to an emergency situation in a more effective or efficient manner.

MODES FOR CARRYING OUT THE PREFERRED EMBODIMENTS

Figure 1A:
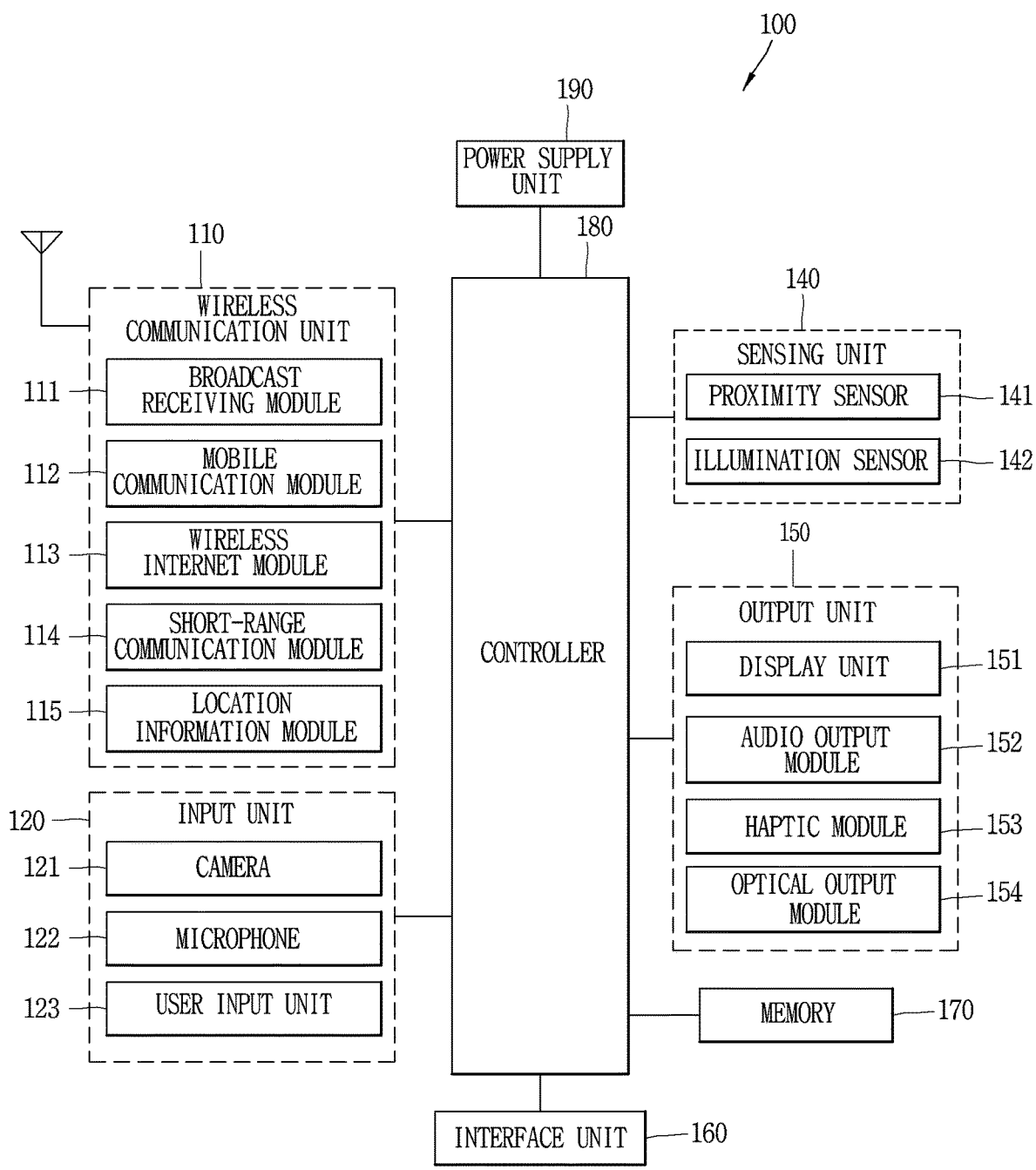
FIG. 1A is a block diagram of a moving robot according to the present disclosure.

Hereinafter, embodiments of the present disclosure will be described in detail with reference to the accompanying drawings, and the same reference numerals are used to designate the same/like components and redundant description thereof will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
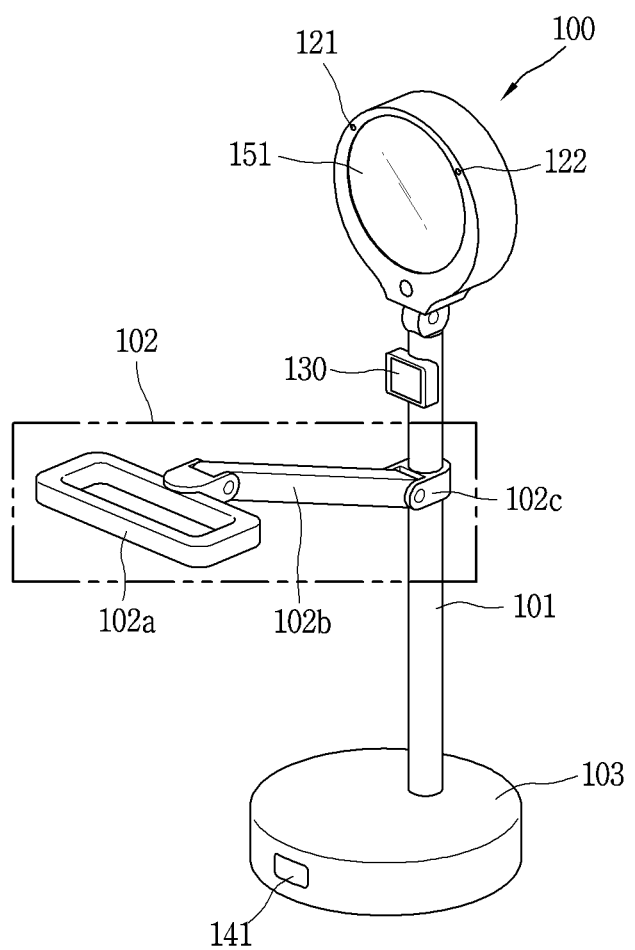
FIG. 1B is a conceptual view of a moving robot according to one example of the present disclosure.

FIG. 1A is a block diagram of a moving robot according to the present disclosure, and FIG. 1B is a conceptual view of a moving robot according to one example of the present disclosure.

Referring to FIG. 1A, the mobile terminal 100 may have components such as a wireless communication unit 110, an input unit 120, a sensing unit 140, an output unit 150, an interface unit 160, a memory 170, a controller (control unit) 180, and a power supply unit 190. It is understood that implementing all of the illustrated components is not a requirement, and that greater or fewer components may alternatively be implemented.

In more detail, the wireless communication unit (or wireless communication module) 110 may typically include one or more modules which permit communications such as wireless communications between the mobile terminal 100 and a wireless communication system, communications between the mobile terminal 100 and another mobile terminal, or communications between the mobile terminal 100 and an external server (or computer). Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input are often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

FIG. 1B is a conceptual view illustrating a moving robot including at least one of the above-described components.

Referring to FIG. 1B, a moving robot 100 includes a main body 101, a display unit 151, a microphone 122, an information collecting unit 130, a moving guide unit 102, a moving unit 103, and a proximity sensor 141.

The main body 101 may have a long rod shape or a cylindrical shape as shown in FIG. 1B, and may have various other shapes. The main body 101 may be provided with the display unit 151, the microphone 122, the information collecting unit 130, the moving guide unit 102, and the moving unit 103.

Hereinafter, the components will be described.

The display unit 151 may be provided at one end of the main body 101. The display unit 151 displays (outputs) information processed in the moving robot 100. For example, the display unit 151 may display route information provided by the moving robot 100 or user interface (UI) and graphic user interface (GUI) information in response to execution screen information of an application program providing this route.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type of the moving robot 100. For instance, in the moving robot 100, a plurality of display units may be arranged on one side, either spaced apart from each other, or be integrated, or these display units may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in the form of a film having a touch pattern and disposed between a window and a display (not shown) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (see FIG. 1A) 123. In some cases, the touch screen may replace at least some of functions of a first manipulation unit 123a.

The audio output module 152 may be implemented in the form of a loud speaker configured to output auditory information from the moving robot 100.

The window of the display unit 151 may be provided with a sound hole for emitting a sound generated from the audio output unit 152. However, the present disclosure is not limited thereto, and the sound may be configured to be emitted along an assembly gap between structures. In this case, a hole independently formed to output an audio sound may not be seen or may otherwise be hidden in terms of appearance, thereby further simplifying the appearance of the moving robot 100.

The information collecting unit 130 configured to receive user information may be further provided at a lower end of the display unit 151. The information collecting unit 130 may be a barcode reader capable of reading barcode information, a button for directly inputting a patient number, or a biosensor capable of receiving biometrics information of a user. The user may allow the moving robot 100 to guide him or her by entering user information onto the collecting unit.

The camera 121 may process image frames such as still or moving images obtained by the image sensor in a capture mode or a video call mode. The processed image frames may then be displayed on the display unit 151 or stored in the memory 170.

On the other hand, the moving robot 100 may include a finger scan sensor which scans a user's fingerprint. The controller 180 may use fingerprint information sensed by the finger scan sensor as an authentication method. The finger scan sensor may be installed in the display unit 151, the user input unit 123, or the moving guide unit 102.

The microphone 122 may be configured to receive the user's voice, other sounds, and the like. The microphone 122 may be provided at a plurality of points, and configured to receive stereo sounds.

The moving guide unit 102 may protrude from the main body 101 so as to make contact with a body part of a user, which allows the user to move with the moving robot 100.

The moving guide unit 102 may include a handle 102a formed to be grasped by the body part (e.g., a hand) of the user, a connecting portion (or arm) 102b for connecting the handle 102a to the main body 101, a rotating portion (or bracket) 102c formed to vertically rotate the connecting portion 102b, and a fixing portion (not shown) for fixing the connecting portion 102b so that the handle 102a is fixed at a predetermined angle.

A position of the handle 102a may be adjusted through the rotating portion 102c so that the user easily grasps the moving guide unit 102. For example, the controller 180 may calculate the position of the handle 102a based on user's height information, and control the moving guide unit 102 such that the handle 102a is positioned at the calculated handle position.

The moving unit (or motor) 103 configured to move the main body 101 along route (or path) information may be disposed at another end of the main body 101. The moving unit 103 may include a motor for moving the main body 101. The moving unit 103 may be designed to be movable along preset route information within a specific place.

The proximity sensor 141 may be mounted on the moving unit 103. The controller 180 may control movement of the moving unit 103 by determining whether an object exists in a position adjacent to a moving direction of the moving unit 103 through the proximity sensor 141.

The moving robot according to the present disclosure may include various components in addition to the above-described components.

Figure 2:
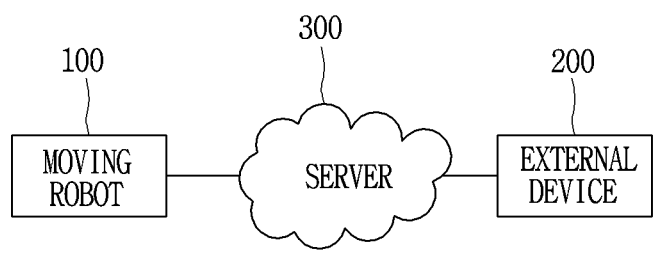
FIG. 2 is a view illustrating a communication between a server and an external device installed in a specific place and a moving robot according to the present disclosure.

Hereinafter, a communication between the moving robot of FIGS. 1A and 1B and other devices in a specific place will be described. FIG. 2 is a view illustrating a communication between a moving robot according to the present disclosure and a server and an external device installed in a specific place.

Referring to FIG. 2, the moving robot 100 according to the present disclosure may perform wireless or wire communications with a server 300 and an external device 200 installed in the specific place.

The server 300 is installed in the specific place to monitor/control the entire network installed in the specific place. In addition, the server 300 may store information related to the specific place or may control electronic devices associated with the specific place.

In addition, the server 300 may transmit data to the moving robot 100 or may receive data from the moving robot 100. For example, the server 300 may receive information of a health condition of the user from the moving robot 100 or may transmit information of a number of patients waiting for an examination to the moving robot 100.

The external device 200 may be a communicable electronic device, for example, a computing device such as a desktop computer, a personal computer, etc. The external device 200 may transmit and receive data through communications with the server 300 or the moving robot 100. For example, the external device 200 may receive information of the health condition of the user from the server 300 or the moving robot 100.

In the foregoing description, the communication between the moving robot according to the present disclosure and the server and the external device installed in the specific place has been described.

Figure 3:
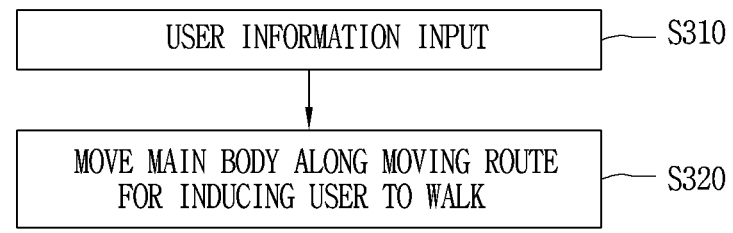
FIG. 3 illustrates a method in which a moving robot according to the present disclosure assists a user in walking at a specific place.
Figure 4:
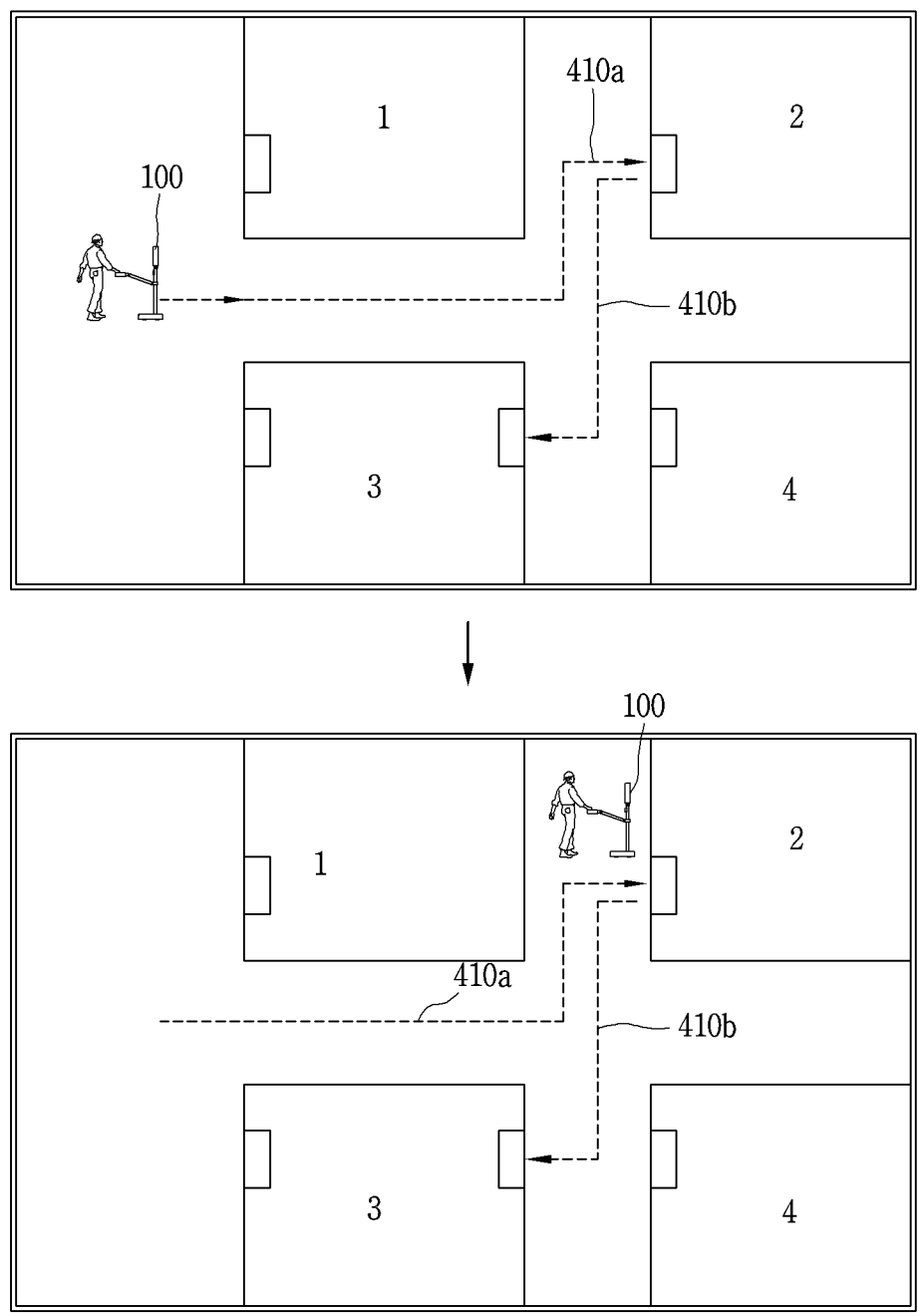
FIGS. 4, 5A, and 5B are conceptual views illustrating the control method of FIG. 3.

Hereinafter, how a moving robot according to the present disclosure provides guidance information related to a specific place will be described. FIG. 3 illustrates a method in which a moving robot according to the present disclosure assists a user in walking at a specific place. FIGS. 4 and 5 are conceptual views illustrating the control method of FIG. 3.

The moving robot according to the present disclosure may provide guidance information related to a specific place to a user who uses the specific place. Hereinafter, a method of providing guidance information will be described with reference to the accompanying drawings.

Referring to FIG. 3, the controller 180 of the moving robot 100 may receive a user information input from a user (S310).

The controller 180 in a standby mode may detect that the user information is input to the information collecting unit 130. The user information may include identification (ID) information for identifying a user, route information, health information, history information, and the like.

The ID information is inherent information assigned to each user who uses a specific place. For example, the ID information may be patient number information for identifying a patient in a hospital, passport or boarding pass information at an airport, and entrance number information at an exhibition.

The route information may be information of a path for sequentially using various facilities installed in the specific place. Such route information may be set differently for each user. For example, the route information may be set differently according to an examination (or checkup) sequence for a patient. As another example, the route information may be set differently depending on a current position of the moving robot.

Health information indicates the health condition of the user. The history information is information about a specific place previously visited by the user.

The controller 180 may sense that a user approaches the main body through the camera 121. In this case, the controller 180 may output notification information to notify the user of its availability. For example, the controller 180 may output a voice such as "Hello? Can I help you?" through the microphone. By doing so, the moving robot 100 may attract the user's attention, and induce the user to use the moving robot. Such a function may also be referred to as a "welcome" function.

After the user information is entered, the controller 180 may control the moving unit 103 such that the main body is moved along a moving route (path) in order to induce the user to walk. (S320).

The controller 180 may extract route information from the user information. In addition, the controller 180 may move the main body in a way that the user can use facilities installed in the specific place while moving along the route information. Thus, the moving robot according to the present disclosure can guide the user to walk (to a destination) and help the user in using facilities scattered in the specific place.

The controller 180 may change the route information extracted from the user information to new route information based on a preset condition while the moving robot is moving. The preset condition may be a condition related to at least one information of a walking speed, a health condition and a current position of the user, and a number of persons waiting. Accordingly, the controller 180 can provide user-customized route information by reflecting real-time situations instead of simply using preset route information based on user information.

Meanwhile, the moving robot according to the present disclosure may further include a moving guide unit 102 formed to make contact with a body part of the user. The moving guide unit 102 supports the body part of the user making contact with the moving guide unit 102, thereby assisting the user in walking. In addition, the moving guide unit 102 may induce the user to move in a direction to which the moving robot moves. The moving guide unit 102 may be provided with a handle 102a formed to be grasped by a hand of the user.

The controller 180 may move the main body while the user's body is in contact with the moving guide unit 102. For example, as shown in FIG. 4, the controller 180 may move the main body along route information 410a and 410b while the handle 102a is grasped by the hand of the user.

For this purpose, the controller 180 may detect whether the moving guide unit is in contact with a user's body. Thereafter, the controller 180 may move the main body through the moving unit 103 while the moving guide unit is in contact with the user's body. Accordingly, the user may feel like walking while holding hands with the moving robot 100.

Meanwhile, when the user located in a position adjacent to the moving robot 100 is recognized through the camera 121, the controller 180 may control the moving guide unit 102 so as to be in contact with the body part of the user.

More specifically, the controller 180 may locate the handle 102a of the moving guide unit 102 at a hand reachable position of the user, based on height information of the user. In more detail, the controller 180 estimates the hand position of the user based on the height information of the user, and controls the connecting portion 102b and the rotating portion 102c such that the handle 102a is located at the hand position of the user. Thus, according to the present disclosure, the user can easily hold the moving guide unit with his or her hand.

The controller 180 may control a moving speed of the moving unit 103 according to the walking speed of the user. In order for this, the controller 180 may calculate the walking speed of the user while walking by holding the handle 102a. The walking speed of the user may be calculated based on information sensed by the speed sensor. For example, the controller 180 may calculate the walking speed of the user through the speed sensor.

Figure 5A:
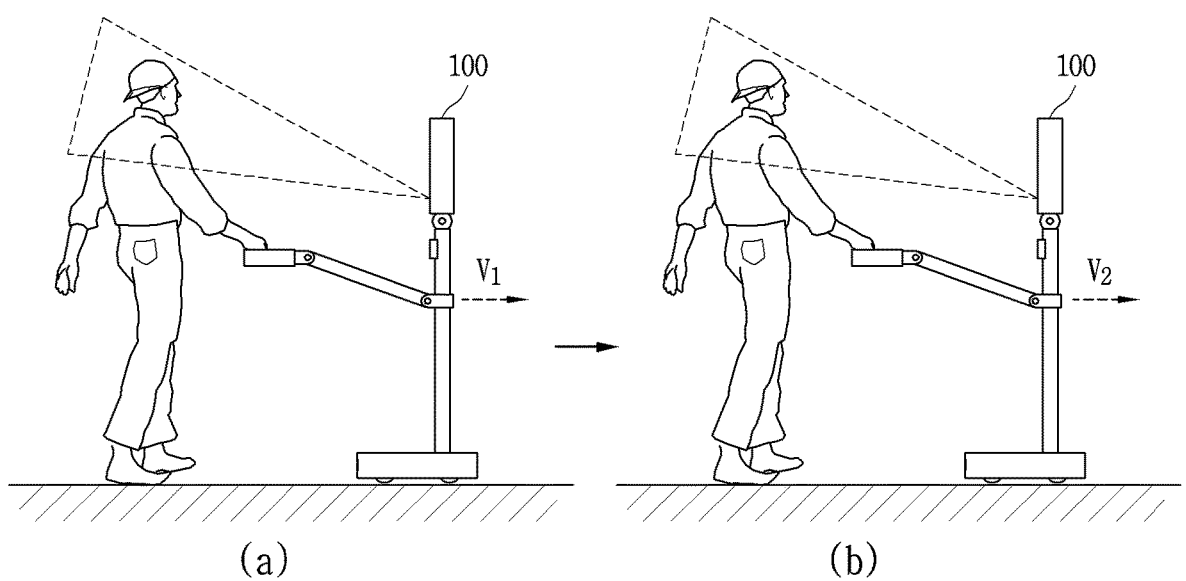

The controller 180 may control the moving unit 103 to move at the same speed as the walking speed of the user. For example, as shown in FIG. 5A, the controller 180 may control the moving unit 103 to move at a moving speed of v2 when the walking speed of the user is sensed at v2 while moving at a preset initial speed of v1. Therefore, the moving robot according to the present disclosure can be controlled to move according to the walking speed of the user. For example, the moving robot is controlled to move at a slower speed when walking with a user having difficulty in walking, and is controlled to move at a faster speed when walking with a user having a faster walking speed. Thus, the user can walk with the moving robot in more secure manner.

Meanwhile, the controller 180 may restrict movement of the moving robot 100 when the user stops walking (or stops moving). Specifically, the controller 180 may determine that the user has stopped during walking when the walking speed of the user is calculated to be zero or when a distance between the user and the main body of the moving robot is greater than a predetermined distance. Alternatively, the controller 180 may determine that the user has stopped when the body part of the user is not in contact with the moving guide unit.

Figure 5B:
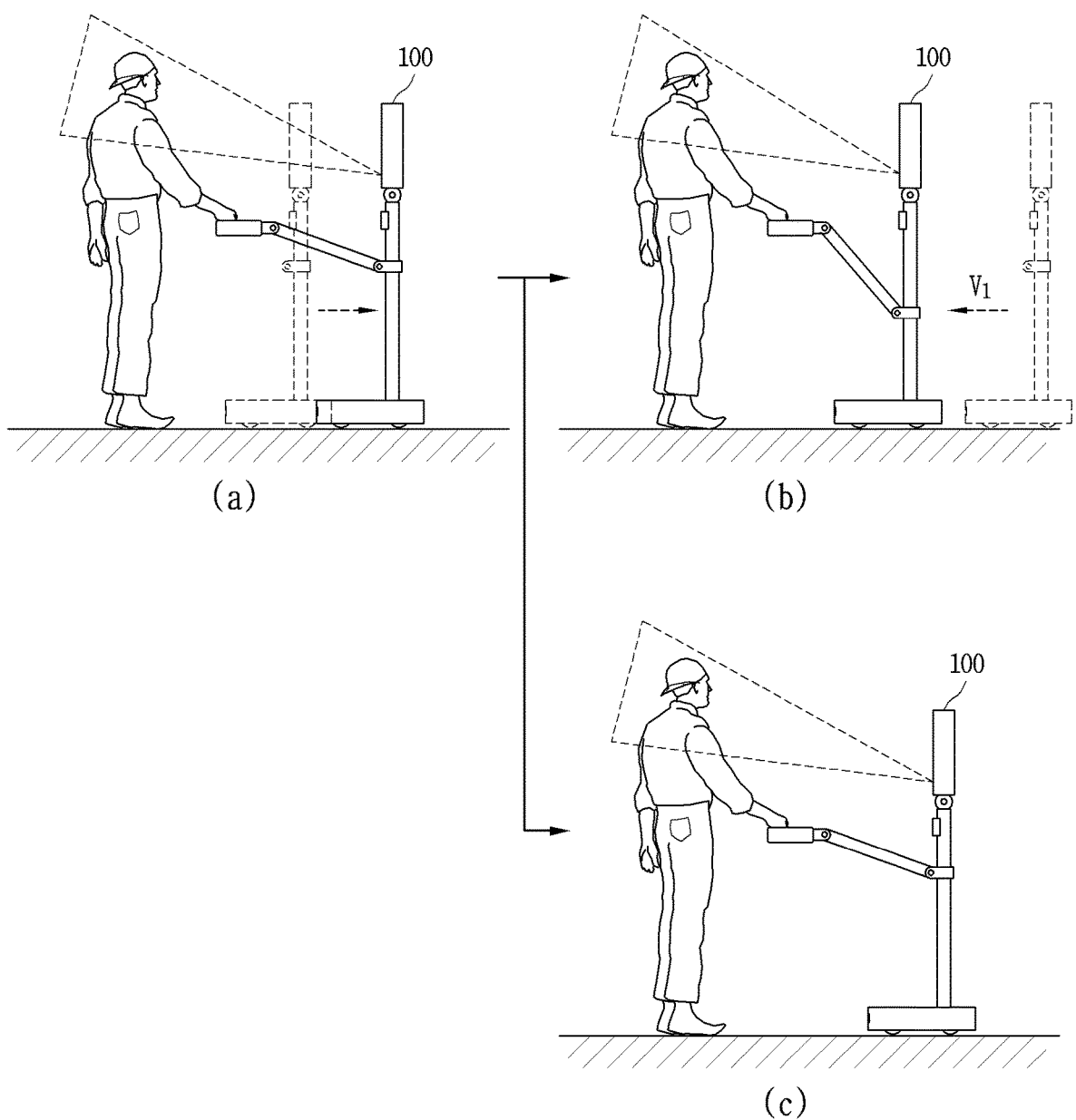

In this case, as shown in (a) and (b) of FIG. 5B, the controller 180 controls the moving unit 103 such that the moving robot 100 moves toward the user, or the moving unit 103 stops moving.

The method of how the moving robot provides route information to the user has been described above. According to the present disclosure, usability or accessibility to facilities scattered in a specific place can be enhanced, thereby providing walking convenience for a user with difficulty in walking.

Figure 6A:
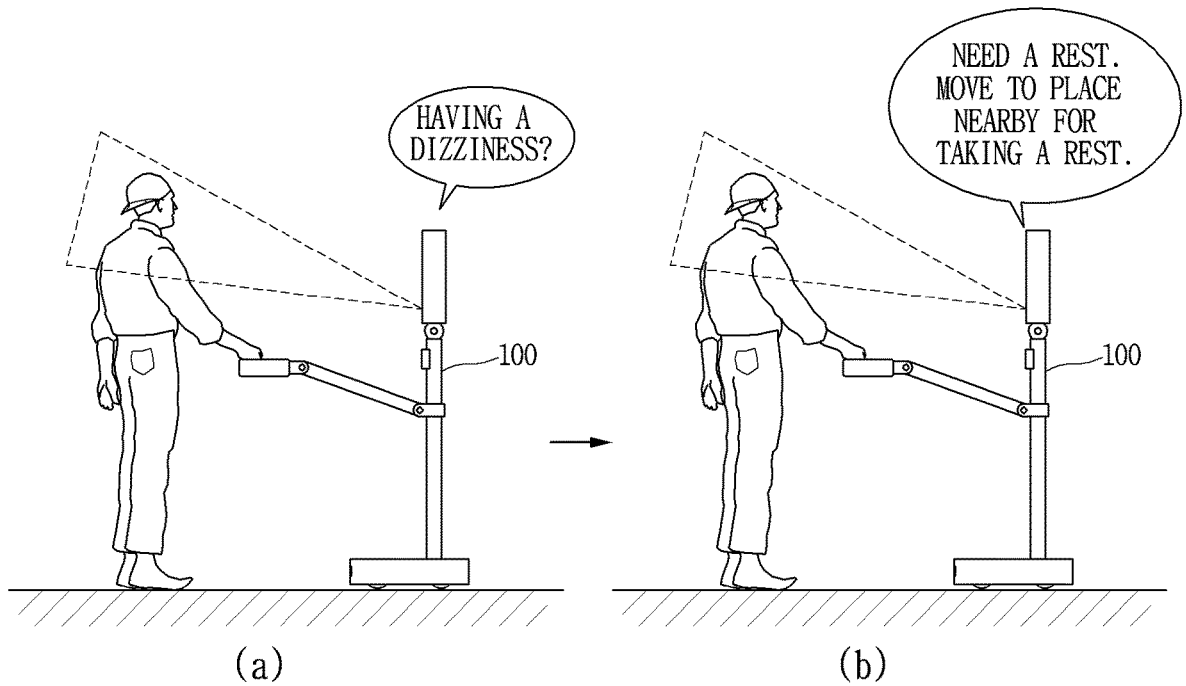
FIGS. 6A and 6B are exemplary views illustrating a moving robot operation when a user has a health problem.
Figure 6B:
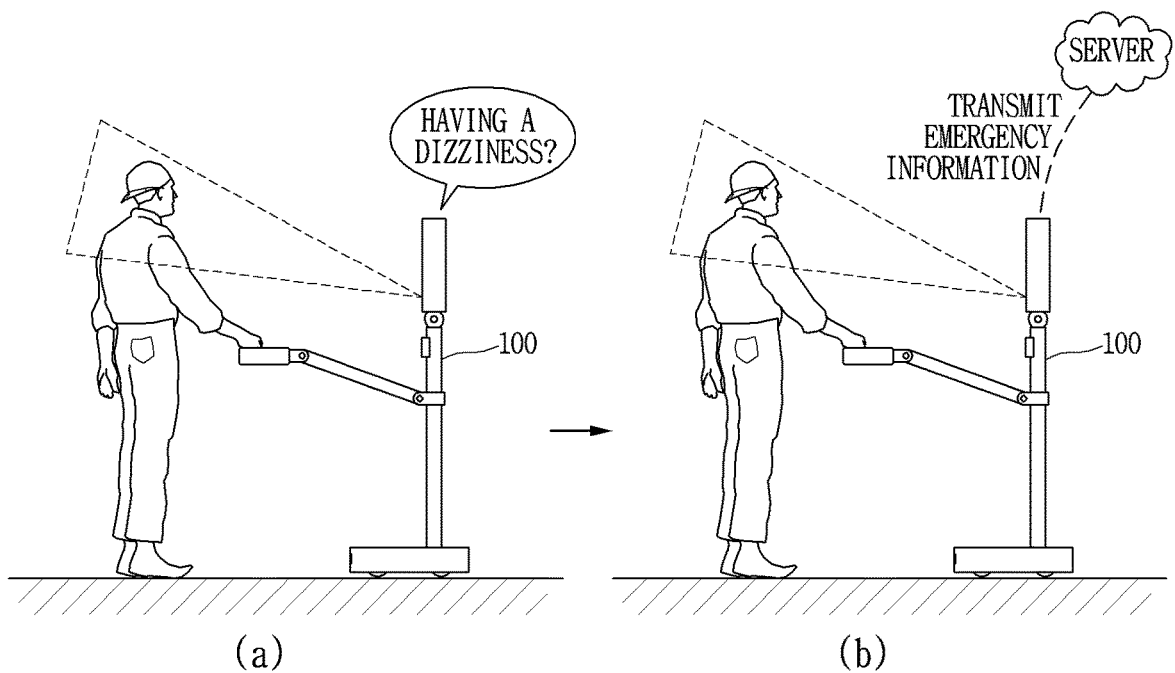

Hereinafter, how the moving robot reacts when noticing a health problem in a user while moving together with the user will be described. FIGS. 6A and 6B are exemplary views illustrating a moving robot operation when a user has a health problem.

The controller 180 may monitor the health condition of the user in real time or periodically while moving together with the user. Alternatively, the controller 180 may sense the health condition of the user when it is determined that the user has stopped while walking with the user.

Specifically, the controller 180 may capture a user image through the camera 121 to determine the health condition of the user, analyze the image through a preset image analysis algorithm, and determine the health condition of the user. For example, the controller 180 analyzes the image of the user's face, then it may conclude that there is a risk of stroke when the face is determined to be skewed or uneven. As another example, based on the analysis result of the user's face image, the controller 180 may determine that the user is tired when excessive sweating on the user's face is noticed.

Alternatively, the controller 180 may measure a heart rate, a blood pressure, a body temperature, etc. of the user by installing a biosensor sensor on the handle 102a on which the user's hand is touched.

The controller 180 may request additional information for determining a precise health condition of the user when the user stops walking or it is determined that the user has a health problem. For example, as shown in (a) of FIG. 6A, when the user stops walking, the controller 180 may determine the health condition of the user through the image. At the same time, the controller 180 may output a voice such as "Feeling a little dizzy?" in order to obtain additional information related to the health condition of the user.

As shown in (b) of FIG. 6A, when the controller 180 determines that the user needs a rest, the controller 180 may control the moving unit 103 such that the user moves to a place for taking a rest. Thus, according to the present disclosure, an appropriate measure can be taken in consideration of a health condition of the user while the moving robot is walking with the user.

Alternatively, as shown in (a) and (b) of FIG. 6B, an emergency situation may be transmitted to the server 300 of the specific place when the controller 180 determines that the user is in the emergency situation. In this case, the server 300 recognizes that the user needs a first aid, and informs a dedicated medical staff assigned to the specific place of user's location and health condition information, for the first aid treatment. Thus, according to the present disclosure, a patient requiring an emergency treatment can get the first aid treatment quickly and swiftly.

The appropriate measure taken by the moving robot when the user has the health problem has been described above. According to the present disclosure, information about a patient requiring an emergency treatment can be noticed more quickly in a very large space such as a hospital, enabling a swift treatment in an emergency situation. As a result, a risk of patient death can be decreased.

Figure 7A:
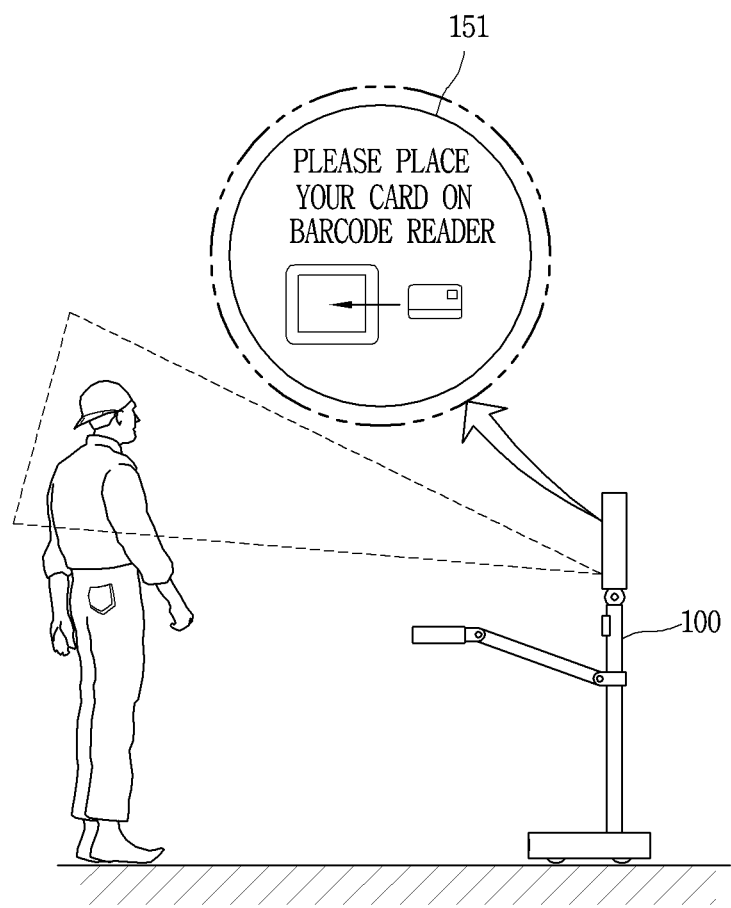
FIGS. 7A to 7C are conceptual views illustrating exemplary embodiments of a notification method for inducing a user to use a moving robot when approached by the user.
Figure 7B:
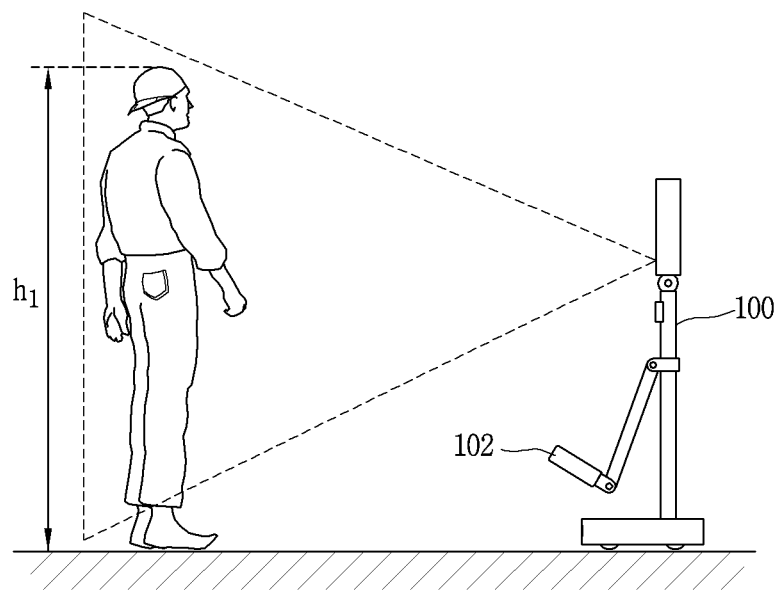
Figure 7B:
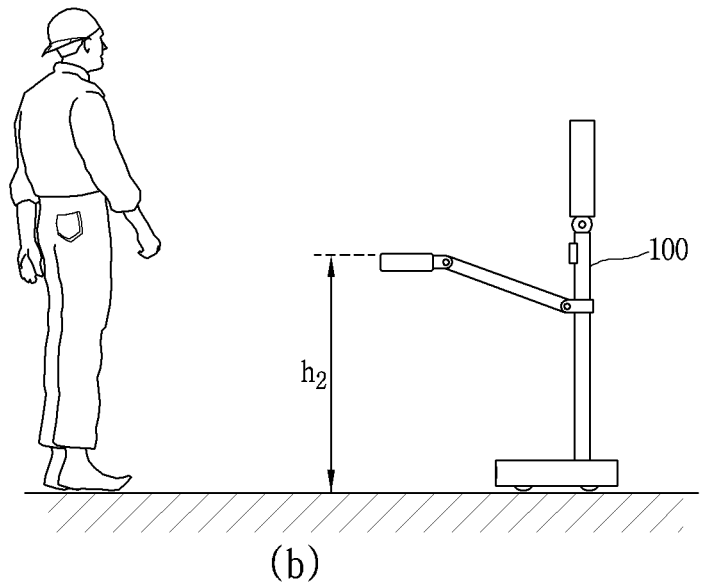
Figure 7C:
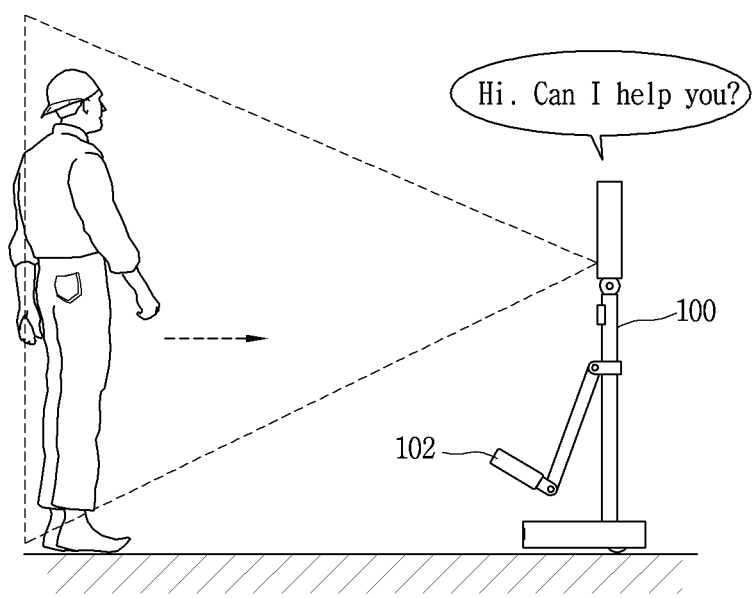

Hereinafter, a method of inducing a user to use the moving robot when approached by the user will be described. FIGS. 7A to 7C are conceptual views illustrating embodiments of a notification method for inducing a user to use a moving robot when approached by the user.

When the user approaches the moving robot 100, the controller 180 may execute a notification function so that the moving robot 100 is used. This notification function may also be referred to as the "welcome function" as described above.

The controller 180 may sense the approach of the user through the camera 121. When a relative distance between the main body and the user is within a predetermined distance, the controller 180 may output the notification information so that the user can recognize availability of the moving robot 100.

For example, as shown in FIG. 7A, the controller 180 may output notification information such as "Please place your card on a barcode reader" on the display unit 151 to guide the user to input user information onto the moving robot 100. By doing this, the user can naturally enter the user information for using the moving robot 100.

As another example, as illustrated in FIG. 7B, the controller 180 may calculate height information h1 of the user located within a predetermined distance from the main body, based on image information of the user photographed through the camera 121. The controller 180 may move the moving guide unit 102 to a height (or position) h2 where a user's hand is reachable, based on the user's height information. Accordingly, the user can use the moving robot as if he or she is walking with a friend while holding hands together.

As another example, as shown in FIG. 7C, when the approach of the user is detected, the controller 180 outputs a voice such as "Hi, can I help you?" Thus, the moving robot according to the present disclosure can induce a user to use it.

The method of inducing the user to use the moving robot through notification information has been described above.

Figure 8A:
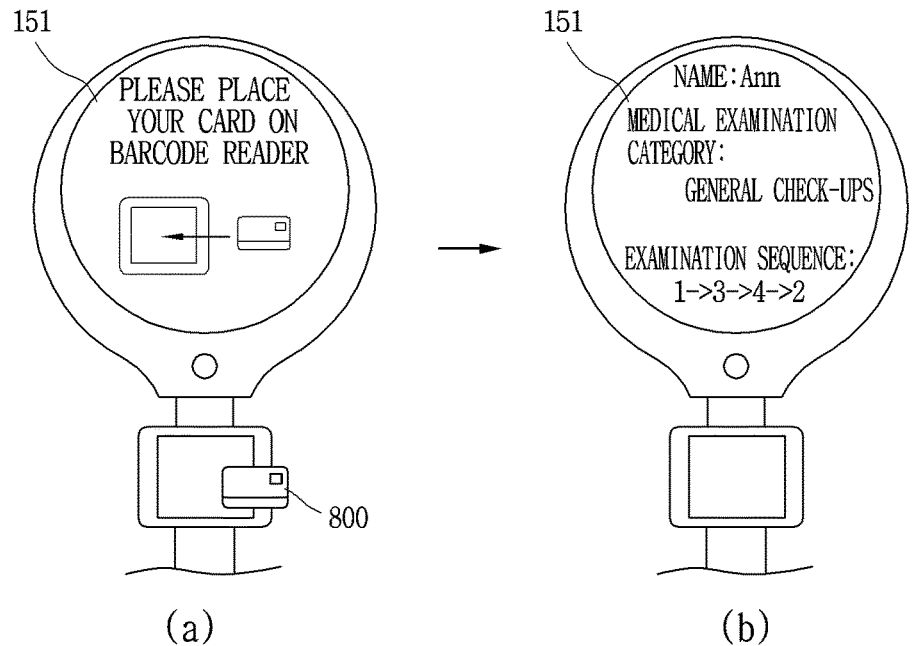
FIGS. 8A and 8B are conceptual views illustrating exemplary embodiments of route information in a moving robot.
Figure 8B:
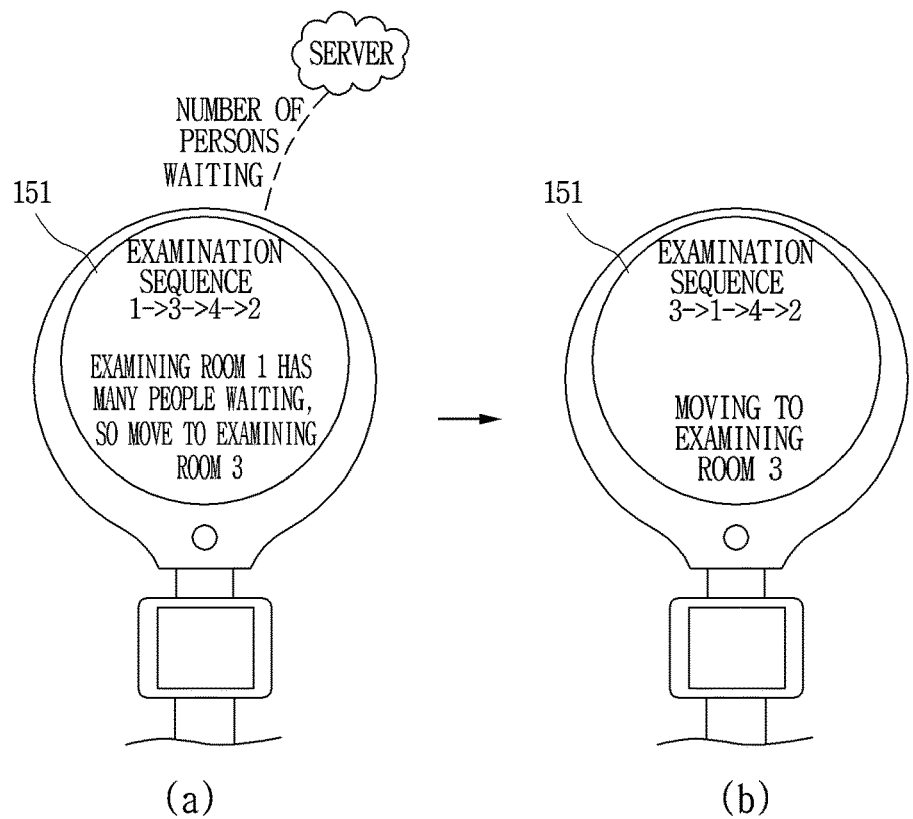

Hereinafter, a method of generating and providing route information related to a specific place in the moving robot will be described. FIGS. 8A and 8B are conceptual views illustrating exemplary embodiments of route information in a moving robot.

The controller 180 may extract route information related to a specific place from user information entered by a user. For example, as shown in (a) of FIG. 8A, the controller 180 may read a barcode including the user information through a barcode reader. As illustrated in (b) of FIG. 8A, the controller 180 may extract a medical examination sequence from the user information, then output it to the display unit 151.

The controller 180 may change the route information to new route information based on a preset condition. The preset condition may be at least one of a walking speed, a health condition and a current position of the user, and a number of persons waiting.

For example, when the walking speed of the user is equal to or lower than a reference speed, the controller 180 may generate new route information that is no obstacles to walking. Here, the reference speed may be an average walking speed of seniors who seniors with decreased mobility. In addition, facilities obstructing the walking may be stairs, uphill facilities, and the like. In other words, the controller 180 may generate route information that minimizes stairs or an uphill path when moving between a plurality of points (locations). Thus, the moving robot according to the present disclosure can provide user-customized route information to seniors with decreased mobility.

As another example, the controller 180 may generate new route information by adding a space for taking a rest to the existing route information when it is determined that the user requires a break. Thus, the moving robot according to the present disclosure enables the user to take a rest depending on his or her health condition.

As another example, the controller 180 may receive, in real time or periodically, the number of persons waiting at each of a plurality of facilities included in the route information from the server 300. Here, the number of persons waiting means the number of persons who are waiting for using the facilities.

In addition, the controller 180 may reset the optimum route information based on the number of persons waiting information. For example, as shown in (a) and (b) of FIG. 8B, if a medical examination sequence is set to 1→3→4→2, the controller 180 may change the examination sequence to 3→1→4→2 when a third examining room has fewer people waiting than that of a first examining room. Accordingly, it can reduce the time taken to receive the medical examination for the user.

The method of generating route information based on each of the preset conditions has been described above.

However, the present disclosure is not limited thereto, and the route information may be generated by combining two or more conditions.

In the foregoing description, the method in which the moving robot generates the route information in the specific place has been described.

Figure 9A:
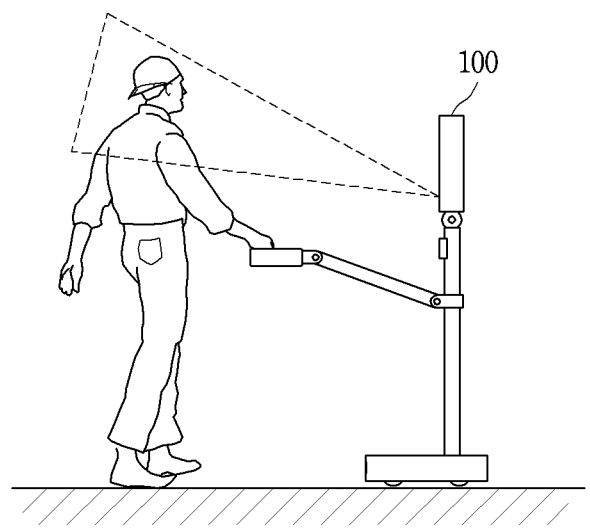
FIGS. 9A and 9B are conceptual views illustrating exemplary embodiments of a moving robot arriving at a specific facility according to route information.
Figure 9A:
Figure 9A:
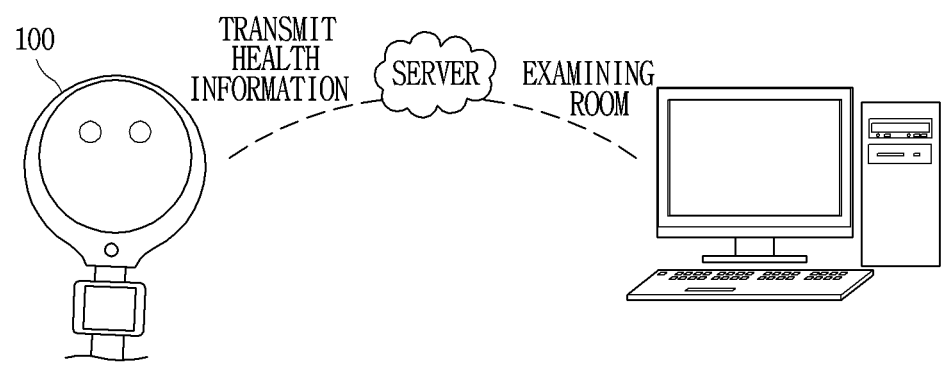
Figure 9B:
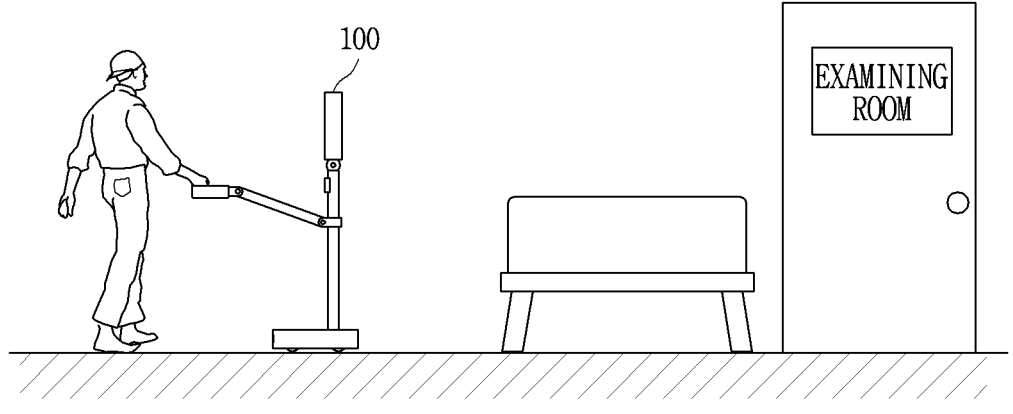
Figure 9B:

Hereinafter, an embodiment in which the moving robot arrives at a specific facility while moving along route information will be described. FIGS. 9A and 9B are conceptual views illustrating exemplary embodiments of a moving robot arriving at a specific facility according to route information.

The moving robot according to the present disclosure may move the main body according to the route information including a plurality of points. The plurality of points means a space where different facilities are located.

As shown in (a) of FIG. 9A, when the moving robot 100 is moving together with a user toward a point where a specific facility included in the route information is located, the controller 180 controls the camera 121 and the biometric sensor to monitor a health condition of the user, for example, a user's pulse, electrocardiogram, breathing state, etc.

In addition, the controller 180 may also receive health questionnaire information indicating the health condition through a dialog with the user. For example, the controller 180 may output a voice such as "Having a sore throat?", then receives "Yes" from the user.

As illustrated in (b) of FIG. 9A, the controller 180 may transmit the health condition information and health questionnaire information of the user to a particular facility (for example, a doctor's computer). Therefore, the user can provide information related to himself or herself before visiting the specific facility, thereby reducing time for using the specific facility.

Meanwhile, as shown in (a) of FIG. 9B, when the controller 180 arrives at the specific facility, the controller 180 may provide notification information so that the user releases the contact (touch) from the moving guide unit 102 to use the specific facility. As illustrated in (b) of FIG. 9B, the controller 180 may control the moving unit 103 such that the main body moves to a standby position when the moving guide unit 102 is no longer in contact with the user. The standby position may be a preset position, such as a parking lot installed in the vicinity of each facility.

Meanwhile, although not illustrated, the controller 180 may sense the approach of the user from the standby position. In order for this, the controller 180 acquires a user face image through the camera 121 and analyzes the face image to distinguish the user.

The controller 180 may move toward the user when detecting the approach of the user whose information is input. Thereafter, the controller 180 may move the main body so that the user moves to the next facility set in the following sequence of the specific facilities included in the route information. Accordingly, the moving robot can continuously provide a guide for moving to the next facility after the user uses the specific facility.

In the foregoing description, the method of using the specific facility has been described.

Figure 10:
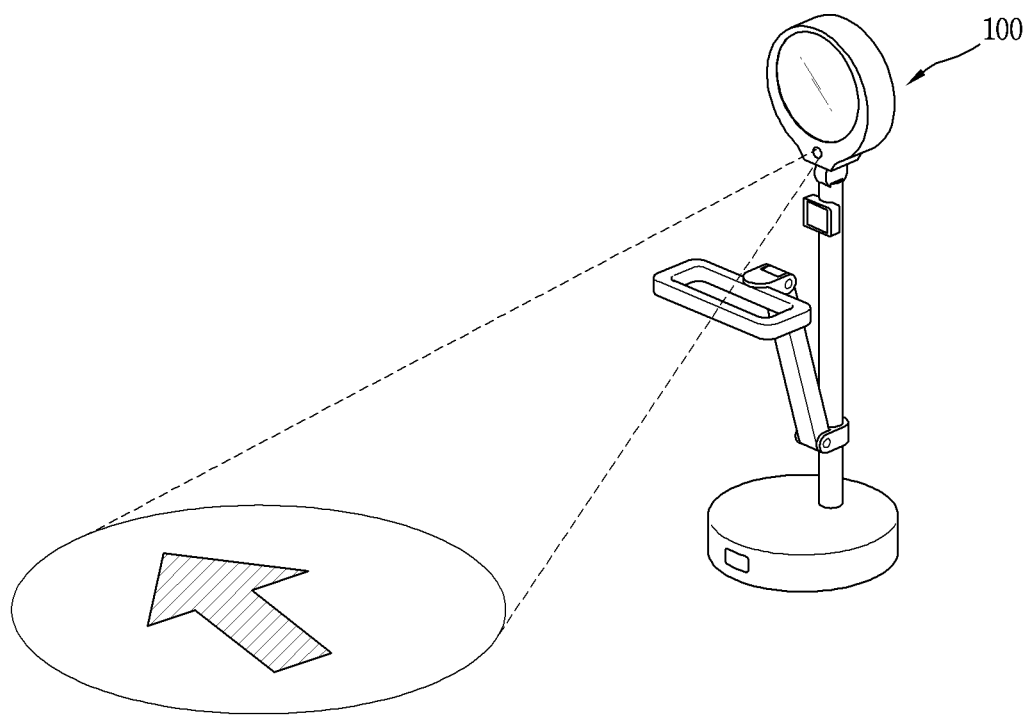
FIG. 10 is a view illustrating a method in which a moving robot guides an evacuation route in an evacuation situation such as a fire and a power outage.

Hereinafter, a method of providing guidance information using the moving robot in an evacuation situation such as a fire or a power outage will be described. FIG. 10 is a view illustrating a method in which a moving robot guides an evacuation route in an evacuation situation such as a fire and a power outage.

The controller 180 of the moving robot 100 according to the present disclosure may output guidance information to evacuate a user from a specific place when an evacuation situation such as a fire or a power outage occurs at the specific place. The guidance information may be information for evacuation to guide the user in an evacuation situation.

At this time, the moving robot 100 may further include a projector 1010 for outputting guidance information. The projector 1010 is an optical device that transmits light on a screen to provide visual information. This screen may be an object that reflects light, for example, walls, floors, ceilings, and the like.

The controller 180 may receive information of the evacuation situation from the server 300 or may detect the evacuation situation through the sensing unit. For example, the controller 180 may determine it is an evacuation situation when a specific amount of carbon dioxide is detected by an air sensor or when a temperature of a room is equal to or higher than a predetermined value detected by a temperature sensor.

The controller 180 may output guidance information through the projector 1010 when it detects that the evacuation situation is present. For example, as shown in FIG. 10, the controller 180 may output visual information (arrow) indicating an emergency escape route through the projector 1010 when the evacuation situation is sensed. Therefore, according to the present disclosure, an emergency escape route can be provided to a user in an evacuation situation.

In the moving robot according to the present disclosure, as described above, guidance information of facilities installed in a specific place is provided to a user who uses the specific place by using user information, and at the same time, a moving speed of the moving robot is controlled according to a walking speed of the user while walking together with the user in a state that a body part of the user is in contact with the moving robot, thereby assisting a user having difficulty in walking.

In addition, the moving robot according to the disclosure can monitor a health condition of a user in real time while moving together with the user, and take an appropriate measure according to health information indicating the health condition of the user. By doing so, the user can get help from the moving robot in a dangerous situation or in a situation requiring an immediate action while moving together with the moving robot. In addition, it can reduce the time taken to use a facility in a place for the user.

Further, the moving robot according to the present disclosure can provide user-customized route information according to a physical condition of a user and a current status of facility use by generating route information based on a preset condition such as a walking speed of the user, etc.

Further, the moving robot according to the present disclosure can provide an evacuation guide in an emergency situation, thereby enabling a user not familiar with a specific place to respond to an emergency situation in a more effective or efficient manner.

The present disclosure described above can be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the controller 180 of the terminal. The above detailed description should not be limitedly construed in all aspects and should be considered as illustrative. Therefore, all changes and modifications that fall within the metes and bounds of the claims, or equivalents of such metes and bounds are therefore intended to be embraced by the appended claims.

The invention claimed is:

1. A moving robot, comprising:
a main body;
at least one of a user input device or a sensor configured to obtain user information associated with a user;
a motor configured to provide a force to move the main body;
a controller configured to manage the motor such that the main body moves along a moving route associated with the user information when the user is in contact with the moving robot;
a handle;
an arm having a first end coupled to the handle; and
a bracket rotatably coupling a second end of the arm to the main body such that the arm is configured to vertically rotate relative to the main body,
wherein the controller manages the motor such that the main body moves according to a walking speed of the user, and
wherein the controller is configured to manage the motor such that the main body moves along the moving route when the user is in contact with the handle.

2. The moving robot of claim 1, wherein the controller further manages the motor such that movement of the main body includes at least one of the main body moving in a direction opposite to the moving route in order to approach the user, or the main body stopping moving when movement of the user is not sensed.

3. The moving robot of claim 2, wherein the controller further determines situation information indicating a surrounding situation of the main body when the movement of the main body is stopped, and manages an output device to output a notification of an emergency situation when the situation information corresponds to the emergency situation.

4. The moving robot of claim 1, further comprising a camera configured to capture a user image,
wherein the controller extracts body information of the user from the user image, and manages the arm to rotate so that the handle is located at a specific position that is determined based on the extracted body information.

5. The moving robot of claim 1, further comprising a speed sensor configured to measure the walking speed of the user.

6. The moving robot of claim 1, wherein the controller generates the moving route based on a condition.

7. The moving robot of claim 6, wherein the condition is related to at least one of the walking speed, a health condition and a current position of the user, or a number of persons waiting.

8. The moving robot of claim 6, wherein the moving route includes a plurality of points, and
wherein the controller regenerates the moving route based on a number of persons waiting at one or more of the plurality of points.

9. The moving robot of claim 8, wherein information of the number of persons waiting at the one or more of the points is received from an external device via wireless communications.

10. The moving robot of claim 1, further comprising a camera configured to capture a user image, wherein the controller determines health information of the user based on the user image.

11. The moving robot of claim 10, wherein the controller manages a wireless communication module to transmit the health information of the user to an external computing device.

12. The moving robot of claim 1, wherein the moving route includes a plurality of points, and
wherein the controller further manages the motor such that the main body stops moving when arriving at a specific point among the plurality of points, and such that the main body moves again when the user makes another contact with the moving robot.

13. The moving robot of claim 1, further comprising a wireless communication module configured to wirelessly communicate with an external computer,
wherein the controller further manages an output device to present guidance information for evacuation when a warning of an emergency situation is received from the external computer via wireless communications.

14. The moving robot of claim 1, further comprising a display,
wherein the controller further manages the display to output guidance information to guide the user to enter the user information when the user approaches the main body.

15. The moving robot of claim 1, wherein the controller further manages the motor to move the main body to a prescribed start position after the main body arrives at a destination of the moving route.

16. A method for controlling a moving robot, the method comprising:
receiving user information associated with a user;
detecting whether the user is in contact with a the moving robot; and
moving a main body of the moving robot along a moving route determined based on the user information while the user is in contact with the moving robot,
wherein the main body moves according to a walking speed of the user, and
wherein moving the main body of the moving robot includes:
generating the moving route to include information of a plurality of points; and
regenerating the moving route based on a number of persons waiting at each of the plurality of points.

17. The method of claim 16, wherein the moving the main body of the moving robot further includes:
moving the main body in a direction opposite to the moving route in order to approach the user; and
stopping a movement of the main body when a movement of the user is not sensed.

18. The method of claim 17, wherein the stopping the movement of the main body includes:
detecting information associated with a surrounding situation of the main body when the movement of the main body is stopped; and
outputting notification information related to an emergency situation when the situation information corresponds to the emergency situation.

19. The method of claim 16, wherein the moving route is generated based on at least one of the walking speed, a health condition and a current position of the user, or a number of persons waiting.

20. The method of claim 16, further comprising:
determining when the user is in contact with the moving robot based on a distance between the user and the robot.

21. A moving robot, comprising:
a main body;
at least one of a user input device or a sensor configured to obtain user information associated with a user;
a motor configured to provide a force to move the main body; and
a controller configured to manage the motor such that the main body moves along a moving route associated with the user information when the user is in contact with the moving robot,
wherein the controller manages the motor such that the main body moves according to a walking speed of the user,
wherein:
the controller generates the moving route based on a condition,
the moving route includes a plurality of points, and
the controller generates the moving route based on a number of persons waiting at one or more of the plurality of points.

* * * * *